3,271,171
GRAY CERAMICS CONTAINING A CALCINED MIXTURE OF ALUMINUM AND VANADIUM COMPOUNDS
Aladar Burgyan, Cleveland, and Werner Votava, Broadview Heights, Ohio, assignors to Ferro Corporation, Cleveland, Ohio
No Drawing. Filed June 16, 1965, Ser. No. 464,541
10 Claims. (Cl. 106—39)

This application is a continuation-in-part of co-pending U.S. application Serial Number 152,920, filed November 16, 1961, now abandoned.

This invention relates to pigments, and more particularly to gray pigments comprising a calcined mixture of vanadium and aluminum compounds.

We have found that, by calcining together an intimate admixture of either the oxides of vanadium and aluminum in certain ratios, or in the alternative, compounds of vanadium and aluminum containing respectively the proper stoichiometric quantities of vanadium and aluminum to provide the required ratio of oxide equivalents of each, upon calcination, we produce a most pleasing and superior gray pigment useful as ceramic body stain, glaze stain, porcelain enamel stain, or for any related purpose for which such pigments may normally be employed such as pigmentation of plastic resins, glass, etc.

Briefly, our invention consists essentially in intimately admixing a vanadium compound, capable of yielding the oxide equivalent of from about 0.5 to about 20 parts by weight of $V_2O_5$, with an aluminum compound, capable of yielding the oxide equivalent of from about 80 to about 99.5 parts by weight of $Al_2O_3$, (based on the calcined weight), with the preferred range being from about 5 to 20 parts by weight of $V_2O_5$ and from about 80.00 to 95.00 parts by weight $Al_2O_3$ as established by Examples 1 and 8 of Table I set forth below, said ranges being established approximately by the specific quantities 5.9 to 18.5, and 81.5 to 94.1 respectively, then calcining said mixture at a temperature of from about 1400° F. to 2700° F. to produce the desired gray pigment. Calcination is carried out for a sufficient length of time, depending upon the size of the batch, degree of fineness, etc., to produce the required shade of gray; three hours calcination time has been found to be adequate, although as is well known time and temperature may be varied over wide limits to produce a given level of heat treatment in a ceramic process. As is further well known, "calcination" in the art of pigment manufacture denotes heat treatment short of fusion, and may be varied for this particular invention within the 1400° F. to 2700° F. range set forth above, with the preferred workable range being within the 1600° F. to 2400° F. limits for pigment No. 2 (from Table I) and as set forth specifically in Table IV below.

After the calcination cycle has been completed and the calcined batch cooled, it is then micropulverized and may be added in varying quantities to ceramic glazes, porcelain enamels, ceramic bodies, etc., to impart a most pleasing gray shade to the fired vitreous coating, or ceramic body as the case may be.

Obviously, our pigment may also be incorporated into plastic resins, paints, etc., as a colorant, much the same as any other inorganic ceramic pigment, it being well known that ceramic pigments of the oxide type, while their primary utility resides in the field of ceramic pigmentation, are also quite useful for a number of other pigmenting purposes.

Accordingly, it is an object of this invention to provide a pigment composition for imparting a gray color to vitreous coatings such as ceramic glazes and porcelain enamel.

It is further an object of this invention to provide a gray pigment composition comprising oxides of vanadium and aluminum.

It is another object of this invention to provide a ceramic body colored by the pigment of the present invention.

It is still another object of this invention to provide a method for imparting a gray color to vitreous coatings such as ceramic glazes and porcelain enamel, and to ceramic bodies.

Yet another object of this invention is to provide a method for manufacturing our novel pigment.

Another object of this invention is to provide a vitreous coating colored with the pigment of this invention.

The pigments of the present invention have the advantage, over gray pigments heretofore used, of providing a cleaner, and more durable color in ceramic bodies, glazes and vitreous porcelain enamels which we feel is the result of superior heat stability.

Following then is a series of illustrative examples covering typical compositions and embracing preferred embodiments of our invention. These are of course to be considered only illustrative of but a few of the innumerable variations of our invention possible without departing from the principle and scope of our novel composition and method.

As set forth above, the essential components of our pigment composition are vanadium and aluminum compounds such as aluminum hydrate, ammonium metavanadate, aluminum oxide, vanadium pentoxide, aluminum nitrate, inter alia. And, while these compounds are most convenient to use, it is possible to use any compound of either metal capable of yielding the required oxide equivalent upon calcination.

So far as the preliminary preparation of the vanadium and aluminum compounds is concerned, any conventional method of milling them into powder form for intimate mixing may be employed, such methods being well known in the art.

After thoroughly admixing, the aluminum-vanadium compound mixture was then calcined in conventional saggers in a suitable furnace, in an oxidizing atmosphere for about three hours at a temperature of 1400° F. to 2700° F.

After calcining, the pigment was cooled to room temperature, micropulverized, and was then ready for incorporation into various items to be colored as hereinafter described.

Table I illustrates the series of batch compositions which were calcined according to the foregoing general procedure, departures from that general procedure such as calcination temperature, also being shown in said Table I. In each example, "Batch" lists the respective amounts of the various compounds mixed prior to calcination, "Yield" indicates the approximate composition of the finished, calcined pigment calculated from the batch components.

TABLE I

*Examples.—Row batch compositions and calculated pigment composition in parts by weight*

|  | #1 | | #2 | | #3 | | #4 | |
|---|---|---|---|---|---|---|---|---|
|  | Batch | Yield | Batch | Yield | Batch | Yield | Batch | Yield |
| $Al(NO_3)_3 \cdot 9H_2O$ | | | | | | | | |
| $AlNH_4(SO_4)_2 \cdot 24H_2O$ | | | | | | | | |
| $Al_2(SO_4)_3 \cdot 18H_2O$ | | | | | | | | |
| $Al(OH)_3$ | 95 | | 90 | | 85 | | 92 | |
| $Al_2O_3$ | | 94.1 | | 88.4 | | 82.7 | | 88.2 |
| $V_2O_5$ | | 5.9 | | 11.6 | | 17.3 | 8 | 11.8 |
| $NH_4VO_3$ | 5 | | 10 | | 15 | | | |
| Calcination Temp | 1,700° F. | | 1,600° F. | | 1,700° F. | | 1,900° F. | |
| Time | 3 hrs. | | 3 hrs. | | 3 hrs. | | 3 hrs. | |

|  | #5 | | #6 | | #7 | | #8 | |
|---|---|---|---|---|---|---|---|---|
|  | Batch | Yield | Batch | Yield | Batch | Yield | Batch | Yield |
| $Al(NO_3)_3 \cdot 9H_2O$ | | | | | | | 97 | |
| $AlNH_4(SO_4)_2 \cdot 24H_2O$ | | | | | 99 | | | |
| $Al_2(SO_4)_3 \cdot 18H_2O$ | 98 | | 98 | | | | | |
| $Al(OH)_3$ | | | | | | | | |
| $Al_2O_3$ | | 88.2 | | 90.6 | | 91.8 | | 81.5 |
| $V_2O_5$ | 2 | 11.8 | | 9.4 | 1 | 8.2 | 3 | 18.5 |
| $NH_4VO_3$ | | | | | | | | |
| Calcination Temp | 1,900° F. | | 1,900° F. | | 1,900° F. | | 1,900° F. | |
| Time | 3 hrs | | 3 hrs. | | 3 hrs. | | 3 hrs. | |

Each pigment composition was then milled respectively into a porcelain enamel, a ceramic clear glaze, an opaque ceramic glaze, and a casting body acording to the mill additions set forth in Table II:

TABLE II

*Mill additions*

[Parts by weight]

|  | A | B | C | D |
|---|---|---|---|---|
|  | Porcelain Enamel | Ceramic Clear Glaze | Glaze Opaque | Casting Body |
| Porcelain Enamel | 100 | | | |
| Glaze | | 90 | 90 | |
| Casting Body | | | | [1] 100 |
| Pigment (invention) | 3 | 3 | 5 | 3 |
| Kaolin | | 10 | 10 | |
| Zirconia | | | 8 | |
| Ball Clay | 6 | | | |
| Bentonite | 0.25 | | | |
| Sodium aluminate | 0.38 | | | |
| Water | 45 | 50 | 55 | 60 |
| Application wt. (wet), g./sq. inch | 2 | 1 | 1 | |
| Firing Temp | 1,500° F. | Cone 3 | Cone 3 | Cone 10 |
| Time | 3½ min. | | | |

[1] Casting Body.

| | Parts by wt. |
|---|---|
| Ball Clay | 9 |
| Calcined kaolin | 12 |
| Kaolin | 12 |
| Talc | 2 |
| Feldspar | 47 |
| Quartz | 18 |
| | 10 |

For purposes of these working examples, 3 to 5 parts by weight pigment were used, although as is well known the quantity of pigment is a matter of choice, the lower limit being dictated by the minimum amount necessary of a given pigment to impart a discernible change in shade in the article to be colored, the upper limit, likewise dictated by desirable shade change, but further, in the case of vitreous coatings, by the amount of pigment which tends to divitrify the vitreous coating, either due to the comparative refractoriness of the pigment, or the fact that at upper concentrations the pigment has literally displaced so much of the glass that the coating can no longer be termed "vitreous."

Therefore, the practical workable range of pigment would fall within the range of 0.5 to about 15.0 parts by weight thereof, respectively, based upon the weight of the glaze, enamel coating, or casting body, with the preferred range from about 3.0 to about 10.0 parts by weight of said pigment.

There is nothing critical about the glaze or enamel frits used in these examples, each one being a conventional lead bearing glaze, of the following oxide composition, smelted, fritted, etc., in a conventional manner, the opaque glaze being opaque by virtue of the 8 parts zirconia added to the clear glaze mill addition shown in Table II. It is one of the novel features of our pigment that it has a gray "color" and maintains its ability to "pigment" any ceramic glaze, enamel or body without "washing out" or "dissolving" therein.

GLAZE FRITTED COMPOSITION

| | Percent |
|---|---|
| $F_2$ | ---- |
| $K_2O$ | 1.7 |
| $Na_2O$ | 2.4 |
| $MgO$ | 0.6 |
| $CaO$ | 8.0 |
| $BaO$ | ---- |
| $PbO$ | 17.2 |
| $Al_2O_3$ | 9.1 |
| $Sb_2O_3$ | ---- |
| $B_2O_3$ | 4.5 |
| $SiO_2$ | 56.6 |
| $TiO_2$ | ---- |
| Total | 100.0 |

The procelain enamel was an antimony opacified, conventional sheet steel enamel applied over a conventionally ground coated sheet steel workpiece, using conventional techniques, the general oxide composition of the frit:

ENAMEL FRITTED COMPOSITION

| | Percent |
|---|---|
| $F_2$ | 7.4 |
| $K_2O$ | 1.6 |
| $Na_2O$ | 16.2 |
| MgO | — |
| CaO | 2.8 |
| BaO | 2.1 |
| PbO | — |
| $Al_2O_3$ | 2.9 |
| $Sb_2O_3$ | 14.4 |
| $B_2O_3$ | 6.0 |
| $SiO_2$ | 43.5 |
| $TiO_2$ | 3.1 |
| Total | 100.0 |

In general, Table III below lists the results obtained with each of the pigment Examples 1 through 8. Generally of course, the color appeared more pastel in the opaque glaze and porcelain enamel than in the clear glaze, the hue and intensity in the casting body closely paralleling that in the clear glaze:

TABLE III

*Examples.—Resultant color in vitreous coatings and casting bodies*

| | |
|---|---|
| #1 | Greenish Lt. Gray. |
| #2 | Medium Gray. |
| #3 | Dark Gray. |
| #4 | Gray. |
| #5 | Lt. Yellow Gray. |
| #6 | Lt. Gray. |
| #7 | Very Lt. Gray. |
| #8 | Dark Gray. |

From Table III it will be readily noted that a wide variety of shades of gray are possible by compositional and processing variations in our novel pigment.

It should be noted here that "color" and "pigment" do not necessarily mean the same thing in this particular field. Thus, a fused mass may have some particular "color," but upon incorporation thereof into the rather severe environment of a vitreous coating or ceramic body it fails as a "pigment" in that it loses its original "color" and imparts no predictable pigmentation to the article sought to be colored.

Why this is, no one is certain, although various theories have been advanced. One is that calcination, short of fusion, somehow opens crystal lattices to permit re-arrangement thereof in the nature of achieving a dry reaction solid solution. See in this regard the academic discussion of this theory by Seabright, U.S. Patent 3,166,430.

Although Seabright cites the need for a particular mineralizer, such obviously wouldn't be required in all situations.

Thus, while King[1] teaches a number of fusions of varying combinations of $Al_2O_3$ and $V_2O_5$ or $V_2O_4$, which, as King observed, displayed various "colors," there is no indication in King that his fusions achieved either the "color" or pigmentation capabilities of our invention. It is to be noted further that King's fusions were not carried out in the precise range of this invention, though had they been, we do not believe King's act of fusing would have produced a suitable pigment.

In order to illustrate the degree of control of color available by varying calcination temperatures, keeping the time constant at three hours, the composition of Example 2, Table I was calcined over a temperature range of 1600° F., 1900° F., 2200° F. and 2400° F. These four variations were then run in the clear glaze in accordance with the procedures outlined above, and the color was noted to vary from a medium light gray to a yellow gray. It is, however, critical that regardless of the calcination temperature of these pigments, it is always carried out short of fusion, which would form a glass with a tendency to go into solution in the glassy phase of a glaze or enamel, thus eliminating, at least severely diluting, any pigmentation effect. Depending upon the ratio of $Al_2O_3:V_2O_5$ within the range of our invention, the fusion point of the binary combination varies, hence the choice of calcination temperatures over a fairly wide range below the fusion point. See Table IV below.

TABLE IV

*Pigment #2 at varying calcination temperatures*

| | A | B | C | D |
|---|---|---|---|---|
| Calcination Temperatures | 1,600° F. | 1,900° F. | 2,200° F. | 2,400° F. |
| Color in Clear Ceramic Glaze B of Table II. | Medium Lt. Gray. | Dark Greenish Gray. | Medium Dark Brown Gray. | Yellow Gray. |

Although none individually is essential to the development of our pleasing gray color, a number of conventional fluxes such as sodium fluoride, sodium chloride, aluminum fluoride, potassium nitrate lithium carbonate and boric acid were added to a batch composition consisting of ninety parts by weight of aluminum hydroxide and ten parts by weight ammonium metavanadate. All samples exhibited a pleasing gray color in composition B of Table II.

Having thus described a range of preferred embodiments of our invention in full in the foregoing specification, but without in any way limiting thereby the broad construction to which our invention is entitled, we claim:

1. As an article of manufacture, a gray ceramic glaze vitrified on a ceramic substrate, said glaze deriving its color from a heat stable pigment contained therein in an amount from about 0.5 to about 15.0 parts by weight thereof, based upon the weight of said glaze, said pigment being the unfused calcination product of a combination of aluminum and vanadium compounds, said pigment deriving its pigmentation effect from the presence therein of the oxide equivalents, respectively, of vanadium, expressed as $V_2O_5$, in from about 0.5 to about 20 parts by weight, and aluminum, expressed as $Al_2O_3$, in from about 80 to about 99.5 parts by weight, said parts by weight based on the total pigment composition taken as 100 parts by weight, said color imparted to said article having improved stability and durability.

2. As an article of manufacture, a gray ceramic glaze vitrified on a ceramic substrate, said glaze deriving its color from a heat stable pigment contained therein in an amount from about 0.5 to about 15.0 parts by weight thereof, based upon the weight of said glaze, said pigment being the unfused calcination product of a combination of aluminum and vanadium compounds, said pigment deriving its pigmentation effect from the presence therein of the oxide equivalents, respectively, of vanadium, expressed as $V_2O_5$, in from about 5.9 to about 18.5 parts by weight, and aluminum, expressed as $Al_2O_3$, in from about 81.5 to about 94.1 parts by weight, said parts by

---

[1] King et al., "Some Properties of the Oxides of Vanadium and Their Compounds," J. Am. Cer. Soc., volume 38, No. 9, September 1955, pages 306–311.

weight based on the total pigment composition taken as 100 parts by weight, said color imparted to said article having improved stability and durability.

3. As an article of manufacture, a vitrified gray porcelain enamel fused upon a base metal substrate, said porcelain enamel deriving its gray color from a heat stable pigment contained therein which is the unfused calcination product of a combination of aluminum and vanadium compounds, said pigment present in said enamel coating in an amount from about 0.5 to about 15.0 parts by weight thereof based on the weight of said porcelain enamel, said pigment deriving its pigmentation effect from the presence therein of the oxide equivalents, respectively, of vanadium, expressed as $V_2O_5$, in from about 0.5 to about 20 parts by weight, and aluminum, expressed as $Al_2O_3$, in from about 80 to about 99.5 parts by weight, said parts by weight based on the total pigment composition taken as 100 parts by weight, said color imparted to said article having improved stability and durability.

4. As an article of manufacture, a vitrified gray porcelain enamel fused upon a base metal substrate, said porcelain enamel deriving its gray color from a heat stable pigment contained therein which is the unfused calcination product of a combination of aluminum and vanadium compounds, said pigment present in said enamel coating in an amount from about 0.5 to about 15.0 parts by weight thereof based on the weight of said porcelain enamel, said pigment deriving its pigmentation effect from the presence therein of the oxide equivalents, respecctively, of vanadium, expressed $V_2O_5$, in from about 5.9 to about 18.5 parts by weight, and aluminum, expressed as $Al_2O_3$, in from about 81.5 to about 94.1 parts by weight, said parts by weight based on the total pigment composition taken as 100 parts by weight, said color imparted to said article having improved stability and durability.

5. As an article of manufacture, a gray fired ceramic body which derives its gray color from a heat stable gray pigment which is the unfused calcination product of a combination of aluminum and vanadium compounds, said gray pigment present in said ceramic body in an amount from about 0.5 to about 15.0 parts thereof based on the weight of said casting body, said pigment deriving its pigmentation effect from the presence therein of the oxide equivalents, respectively, of vanadium, expressed as $V_2O_5$, in from about 0.5 to about 20 parts by weight, and aluminum, expressed as $Al_2O_3$, in from about 80 to about 99.5 parts by weight, said parts by weight based on the total pigment composition taken as 100 parts by weight, said color imparted to said article having improved stability and durability.

6. As an article of manufacture, a gray ceramic glaze vitrified on a ceramic substrate, said glaze deriving its color from a heat stable pigment contained therein an amount from about 3.0 to about 10.0 parts by weight thereof, based upon the weight of said glaze, said pigment being the unfused calcination product of a combination of aluminum and vanadium compounds, said pigment deriving its pigmentation effect from the presence therein of the oxide equivalents, respectively, of vanadium, expressed as $V_2O_5$, in from about 0.5 to about 20 parts by weight, and aluminum, expressed as $Al_2O_3$, in from about 80 to about 99.5 parts by weight, said parts by weight based on the total pigment composition taken as 100 parts by weight, said color imparted to said article having improved stability and durability.

7. As an article of manufacture, a gray ceramic glaze vitrified on a ceramic substrate, said glaze deriving its color from a heat stable pigment contained therein an amount from about 3.0 to about 10.0 parts by weight thereof, based upon the weight of said glaze, said pigment being the unfused calcination product of a combination of aluminum and vanadium compounds, said pigment deriving its pigmentation effect from the presence therein of the oxide equivalents, respectively, of vanadium, expressed as $V_2O_5$, in from about 5.9 to about 18.5 parts by weight, and aluminum, expressed as $Al_2O_3$, in from about 81.5 to about 94.1 parts by weight, said parts by weight based on the total pigment composition taken as 100 parts by weight, said color imparted to said article having improved stability and durability.

8. As an article of manufacture, a vitrified gray porcelain enamel fused upon a base metal substrate, said porcelain enamel deriving its gray color from a heat stable pigment contained therein which is the unfused calcination product of a combination of aluminum and vanadium compounds, said pigment present in said enamel coating in an amount from about 3.0 to about 10.0 parts by weight thereof based on the weight of said porcelain enamel, said pigment deriving its pigmentation effect from the presence therein of the oxide equivalents, respectively, of vanadium, expressed as $V_2O_5$, in from about 0.5 to about 20 parts by weight, and aluminum, expressed as $Al_2O_3$, in from about 80 to about 99.5 parts by weight, said parts by weight based on the total pigment composition taken as 100 parts by weight, said color imparted to said article having improved stability and durability.

9. As an article of manufacture, a vitrified gray porcelain enamel fused upon a base metal substrate, said procelain enamel deriving its gray color from a heat stable pigment contained therein which is the unfused calcination product of a combination of aluminum and vanadium compounds, said pigment present in said enamel coating in an amount from about 3.0 to about 10.0 parts by weight thereof based on the weight of said porcelain enamel, said pigment deriving its pigmentation effect from the presence therein of the oxide equivalents, respectively, of vanadium, expressed as $V_2O_5$, in from about 5.9 to about 18.5 parts by weight, and aluminum, expressed as $Al_2O_3$, in from about 81.5 to about 94.1 parts by weight, said parts by weight based on the total pigment composition taken as 100 parts by weight, said color imparted to said article having improved stability and durability.

10. As an article of manufacture, a gray fired ceramic body which derives its gray color from a heat stable gray pigment which is the unfused calcination product of a combination of aluminum and vanadium compounds, said gray pigment present in said ceramic body in an amount from about 3.0 to about 10.0 parts thereof based on the weight of said casting body, said pigment deriving its pigmentation effect from the presence therein of the oxide equivalents, respectively, of vanadium, expressed as $V_2O_5$, in from about 0.5 to about 20 parts by weight, and aluminum, expressed as $Al_2O_3$, in from about 80 to about 99.5 parts by weight, said parts by weight based on the total pigment composition taken as 100 parts by weight, said color imparted to said article having improved stability and durability.

References Cited by the Examiner

UNITED STATES PATENTS 2,847,317   8/1958   Carnahan et al.  ------ 106—288
3,025,178   3/1962   Seabright  ----------- 106—39

OTHER REFERENCES

King et al.: "Some Properties of the Oxides of Vanadium and their Comounds," J. Am. Cer. Soc., vol. 38, No. 9, September 1955, pp. 306–311.

TOBIAS E. LEVOW, *Primary Examiner.*

S. E. MOTT, *Assistant Examiner.*